US012361748B2

(12) United States Patent
Videau et al.

(10) Patent No.: US 12,361,748 B2
(45) Date of Patent: *Jul. 15, 2025

(54) METHOD FOR ESTIMATING AN INTER-RIDGE DISTANCE RELATING TO A FINGERPRINT

(71) Applicant: IDEMIA IDENTITY & SECURITY FRANCE, Courbevoie (FR)

(72) Inventors: Victor Videau, Courbevoie (FR); Guy Mabyalaht, Courbevoie (FR)

(73) Assignee: IDEMIA IDENTITY & SECURITY FRANCE, Courbevoie (FR)

( * ) Notice: Subject to any disclaimer, the term of this patent is extended or adjusted under 35 U.S.C. 154(b) by 0 days.

This patent is subject to a terminal disclaimer.

(21) Appl. No.: 18/405,403

(22) Filed: Jan. 5, 2024

(65) Prior Publication Data
US 2024/0312246 A1   Sep. 19, 2024

(30) Foreign Application Priority Data
Mar. 17, 2023 (FR) ..................................... 23 02490

(51) Int. Cl.
*G06V 40/13* (2022.01)
*G06V 10/764* (2022.01)
*G06V 10/776* (2022.01)
*G06V 10/82* (2022.01)
*G06V 40/12* (2022.01)

(52) U.S. Cl.
CPC ........ *G06V 40/1376* (2022.01); *G06V 10/765* (2022.01); *G06V 10/776* (2022.01); *G06V 10/82* (2022.01); *G06V 40/1359* (2022.01)

(58) Field of Classification Search
CPC ..................................................... G06V 40/13
See application file for complete search history.

(56) References Cited

U.S. PATENT DOCUMENTS 10,198,612 B1 *   2/2019   Hsu ........................... G06T 3/18
2010/0119126 A1 *   5/2010   Rane ....................... G06V 10/28
382/125

OTHER PUBLICATIONS

French Preliminary Search Report and Written Opinion issued Sep. 18, 2023 in French Application 23 02490 filed on Mar. 17, 2023, 7 pages.

(Continued)

*Primary Examiner* — Joseph R Haley
(74) *Attorney, Agent, or Firm* — Oblon, McClelland, Maier & Neustadt, L.L.P.

(57) ABSTRACT

A method comprising: generating a classification map comprising, for each block forming part of a plurality of blocks of a test image and for each class of a plurality of classes of distances in pixels, a score indicative of a probability of existence in the test image of a segment passing through the block and the length of which in pixels constitutes an inter-ridge distance of a fingerprint included in the class, generating a distance map comprising, for each block of the plurality of blocks, a local inter-ridge distance in pixels estimated for the block, and estimating an average inter-ridge distance in pixels of the test fingerprint on the basis of the inter-ridge distance map, the estimation comprising selecting, from the inter-ridge distance map, local inter-ridge distances of interest according to a criterion of proximity to the class of interest, and computing an average of the local inter-ridge distances of interest.

17 Claims, 5 Drawing Sheets

(56) References Cited

OTHER PUBLICATIONS

Ren et al., "Fingerprint Scaling" Topics in Cryptology, 2008, pp. 474-481.
Ren et al., "A Framework of Fingerprint Scaling" Telkomnika Indonesian Journal of Electrical Engineering vol. 11, No. 3, 2013, pp. 1547-1559.

* cited by examiner

METHOD FOR ESTIMATING AN INTER-RIDGE DISTANCE RELATING TO A FINGERPRINT

FIELD OF THE INVENTION

The present invention relates to the field of the processing applied to images containing fingerprints.

PRIOR ART

Methods for identifying or authenticating an individual using her or his fingerprints are known, these methods comprising the following steps. Conventionally, a test image containing a test fingerprint of an individual is acquired, and this image is compared with a reference image containing a reference fingerprint, so as to verify whether the test fingerprint and the reference fingerprint match. If such a match is found, then the individual is considered to have been recorded beforehand.

Some of these methods comprise estimating an inter-ridge distance relating to the test fingerprint. It will be recalled that an inter-ridge distance is a distance separating two ridges of a fingerprint.

In these methods, the inter-ridge distance is estimated on the basis of the test image while taking into account the resolution of the test image (usually expressed in pixels per inch, abbreviated to ppi).

However, such an inter-ridge distance may be estimated inaccurately with these methods, above all when the test image comprises an interfering signal. For example, in the context of a police investigation, it is possible to use as test image a photograph of a fingerprint left on a medium, this photograph being acquired by a generic device, i.e. a device not specifically dedicated to the acquisition of fingerprints. A fingerprint appearing in an image of this type is commonly referred to as a "latent" fingerprint. The medium on which the latent print was left may comprise interfering patterns liable to compromise the accuracy of the estimation of the aforementioned methods.

SUMMARY OF THE INVENTION

One aim of the invention is to estimate an inter-ridge distance in an image containing a fingerprint accurately even in the case where the image contains an interfering signal.

This aim is achieved via a method for processing a test image containing a test fingerprint, the method comprising the following computer-implemented steps: generating a classification map from the test image, the classification map comprising, for each block forming part of a plurality of blocks of the test image and for each class of a plurality of classes of distances in pixels, a score associated with the block and with the class, the score associated with the block and with the class being indicative of a probability of existence in the test image of a segment passing through the block and the length of which in pixels constitutes an inter-ridge distance of the fingerprint included in the class; generating a local inter-ridge distance map on the basis of the classification map, the local inter-ridge distance map comprising, for each block of the plurality of blocks, a local inter-ridge distance in pixels estimated for the block; estimating an average inter-ridge distance in pixels of the test fingerprint on the basis of the local inter-ridge distance map and of a class of interest forming part of the plurality of classes of distance in pixels, the estimation comprising selecting, from the local inter-ridge distance map, local inter-ridge distances of interest according to a criterion of proximity to the class of interest, and computing an average of the local inter-ridge distances of interest.

The method may also comprise the following features, alone or combined with one another whenever this makes sense technically.

Preferably, the local inter-ridge distance in pixels estimated for a block is computed on the basis of the following data: a first score indicative of a maximum probability of existence among the scores associated with the block, the first score being associated with a first class forming part of the plurality of classes of distances, and a first distance value in pixels that is included in the first class.

Preferably, the local inter-ridge distance in pixels estimated for a block is computed on the basis of the following data: a second score associated with a second class, the second class being adjacent to the first class in the plurality of classes of distances in pixels, and a second distance value in pixels that is included in the second class.

Preferably, the local inter-ridge distance in pixels estimated for a block is computed on the basis of the following data: a third score associated with a third class, the third class being adjacent to the first class in the plurality of classes of distances in pixels, and the third class being distinct from the second class, and a third distance value in pixels that is included in the third class.

Preferably, the local inter-ridge distance in pixels estimated for a block is computed as an average of the first distance value, of the second distance value and of the third distance value, weighted by the first score, the second score and the third score, respectively.

Preferably, the method further comprises steps of: generating a preliminary classification map from the test image, the preliminary classification map comprising, for each block of a set of blocks covering the entire test image and for each class of the plurality of classes of distances in pixels, a preliminary score associated with the block and with the class, the preliminary score associated with the block and with the class being indicative of a probability of existence in the test image of a segment passing through the block and the length of which in pixels constitutes an inter-ridge distance of the fingerprint included in the class; on the basis of the test image, generating a binary mask estimating, for each block of the set of blocks, whether or not the block contains a fingerprint; applying the binary mask to the preliminary classification map so as to generate the classification map, the plurality of blocks being restricted to each block that the binary mask deems to contain a fingerprint.

Preferably, the preliminary classification map is generated using a first neural network, and the binary mask is generated using a second neural network operating in parallel with the first neural network.

Preferably, application of the binary mask to the preliminary classification map comprises obtaining a Hadamard product of the preliminary classification map and of the binary mask.

Preferably, the method further comprises extracting features from the test image using a neural network devoid of normalization layer, the classification map being derived from the extracted features.

Preferably, the local inter-ridge distances of interest selected according to the criterion of proximity to the class of interest are local inter-ridge distances comprised in an interval having bounds determined on the basis of a distance value included in the reference class, the interval forming a neighborhood around the distance value.

Preferably, the method comprises steps of: computing a histogram on the basis of the classification map, the histogram comprising, for each class forming part of the plurality of classes of distances in pixels, an aggregated score obtained by aggregating the scores associated with the class; and detecting at least one local maximum of the histogram, the class of interest being associated with a local maximum detected in the histogram.

Preferably, a plurality of local maxima is detected in the histogram, each local maximum being associated with one class of interest forming part of the plurality of classes of distances in pixels, and the estimating step is implemented for each class of interest, so as to produce a plurality of average inter-ridge distances in pixels.

Preferably, the method further comprises steps of: obtaining a reference inter-ridge distance in pixels relating to a reference fingerprint contained in a reference image; resizing the test image to a test image resized so that the average inter-ridge distance in pixels corresponds to the reference inter-ridge distance; commanding comparison between the resized test image and the reference image, so as to verify a match between the test fingerprint and the reference fingerprint.

Preferably, the plurality of local maxima comprises a principal local maximum and a secondary local maximum less than the principal local maximum; the plurality of average inter-ridge distances in pixels comprises a principal distance computed on the basis of the principal local maximum and a secondary distance computed on the basis of the secondary local maximum; and the method further comprises: a first implementation of the resizing and comparison-commanding steps on the basis of the principal distance, and, after the first implementation, a second implementation of the resizing and comparison-commanding steps on the basis of the secondary distance instead of the principal distance, preferably provided that the first implementation led to a result indicating that the test fingerprint and the reference fingerprint do not match.

Preferably, each block is one pixel of the image.

Preferably, the plurality of classes of distances respects the following rule: the higher a median value of a class of the plurality of classes of distances, the larger a size of the class.

A computer program product is also provided, this computer program product comprising program code instructions for executing the steps of the above method, when this program is executed by a computer.

A computer-readable memory storing instructions that are executable by the computer in order to execute the steps of the above method is also provided.

DESCRIPTION OF THE FIGURES

Further features, aims and advantages of the invention will become apparent from the following description, which is purely illustrative and non-limiting, and which should be read with reference to the appended drawings, in which.

In all of the figures, elements that are similar have been designated by identical references.

DETAILED DESCRIPTION OF THE INVENTION

Figure 1:
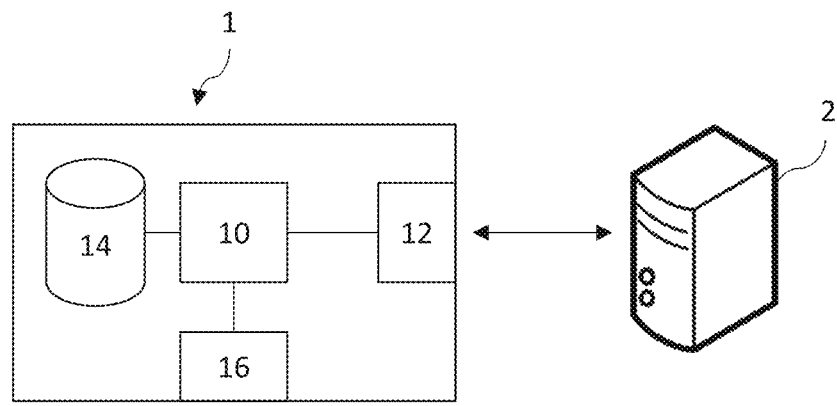
FIG. 1 schematically illustrates an image-processing device according to one embodiment.

With reference to FIG. 1, an image-processing device 1 comprises a processor 10, a communication interface 12 and a memory 14.

The processor 10 is configured to implement certain steps of an image-processing method that will be described below. The processor 10 may have any structure. The processor comprises one or more cores, each core being configured to execute the code instructions of a program so as to implement the aforementioned steps. It will be seen below that this program uses neural networks.

The communication interface 12 is configured to allow the image-processing device 1 to receive images to be processed and to communicate with a server 2. The communication interface 12 is of any type. It is for example a wired (Ethernet) interface or a wireless radio interface using any communication protocol (Wi-Fi, Bluetooth, etc.).

The memory 14 is configured to store data manipulated or produced by the processor 10. The memory 14 is of any type. Conventionally, the memory 14 comprises a volatile memory for storing data temporarily, and a non-volatile memory for storing data persistently, i.e. in a manner that preserves the data when the non-volatile memory is turned off.

The memory 14 is in particular configured to store an image received by the processing device 1 and intended to be processed by the processor.

The image-processing device 1 may also comprise a sensor 16 of images containing fingerprints. The sensor may optionally comprise a transparent surface that serves as a medium against which a finger may be pressed, so as to stabilize the finger and thus allow a fingerprint of the finger to be clearly seen in an image delivered by the sensor.

The server 2 stores a database of reference images containing reference fingerprints relating to previously recorded reference individuals.

Classes of Distances in Pixels

As will be seen below, the processing device 1, and more particularly the processor 10, is configured to implement processing operations based on a plurality of N predefined classes of distances in pixels.

Each of the N classes includes a set of values of distance in pixels that is specific thereto, this set of values being defined in advance.

As indicated above, the distances are expressed in pixels, and not in a unit of length (such as inch or meter) or in a unit dependent on a unit of length (as is the case with resolution, which is generally expressed in pixels/inch, abbreviated to ppi). In the present text, it is assumed that a distance in pixels may be a decimal value, and is therefore not necessarily an integer value.

Each class has a size that characterizes the amount of distance values in pixels included in the class. Moreover, each class has a median distance value in pixels.

Within the plurality of N classes, the classes are ordered according to their respective median values. Thus, the plurality of N classes comprises two end classes, and possibly N−2 intermediate classes if N>2. Each intermediate class has two classes adjacent to it within the plurality of N classes. In contrast, each end class has a single class adjacent to it.

By convention, the classes are assigned respective indices ranging from 1 to N, in order of median value. Thus, an intermediate class of index i is adjacent to the classes of indices i−1 and i+1.

Preferably, the classes are contiguous, in the sense that for any i ranging from 1 to N−1 the upper bound of the class of index i is equal to the lower bound of the class of index i+1. In this way, the respective intervals of the classes when put end to end cover a continuous interval, without much redundancy (neglecting the bounds in the case where the intervals are closed).

Preferably, the plurality of N classes respects the following rule: the higher a median value of a class, the larger a size of the class. In other words, for any i ranging from 1 to N−1, the class of index i+1 has a size larger than the size of the class of index i. It will be seen below that this feature is advantageous.

In one non-limiting embodiment, each class of distance in pixels is an interval of distance values in pixels. This interval comprises a lower bound (minimum distance value in pixels) and an upper bound (maximum distance value in pixels). In this embodiment, the size of a class is the length of the interval (from the lower bound to the upper bound). Moreover, the median value of the class is, in this embodiment, the central value of the interval, i.e. a value located equidistant from the lower bound and from the upper bound.

For example, a plurality of classes respecting all the principles defined above is detailed in the following table (in which N=5):

| Index of the class | Values included in the class (expressed in pixels) | Class size (expressed in pixels) |
| --- | --- | --- |
| 1 | [10, 11] | 1 |
| 2 | [11, 12.1] | 11.1 |
| 3 | [12.1, 13.31] | 1.21 |
| 4 | [13.31, 14.64] | 1.33 |
| 5 | [14.64, 16.11] | 1.47 |

This plurality of 5 classes covers an overall interval extending from 10 to 16.11 pixels. This interval makes sense, because it covers a range of inter-ridge distances in pixels measurable in a bank of fingerprint images having various resolutions (about 500 ppi to about 1000 ppi).

Image-Processing Method

Figure 2:
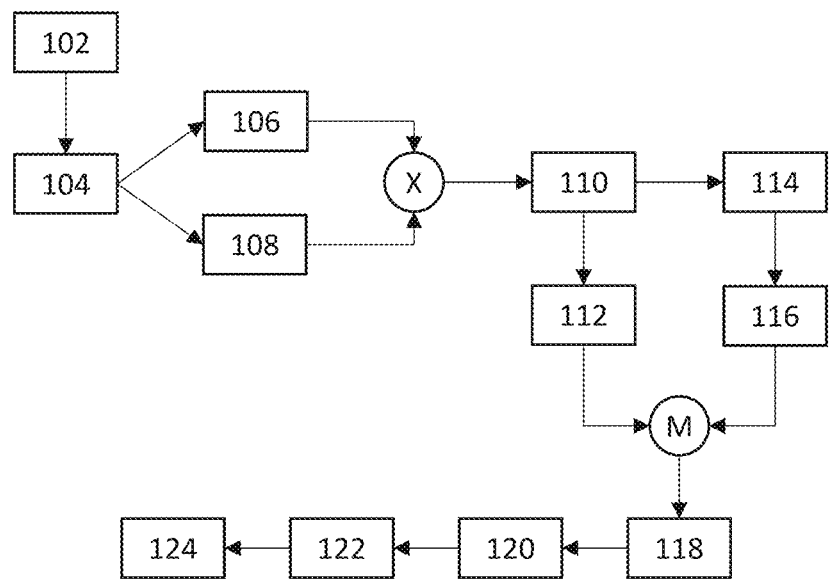
FIG. 2 is a flowchart of steps of an image-processing method according to one embodiment.

With reference to the flowchart of FIG. 2, a method implemented by the device 1 comprises the following steps.

In a step 102, the processing device 1 receives a test image containing a test fingerprint of an individual. Here, the qualifier "test" is just intended to make it possible to distinguish between the received image and the reference images stored by the server.

Two types of fingerprints are distinguished between: fingerprints contained in images acquired by a dedicated image sensor (these are referred to as tenprints) and so-called "latent" fingerprints, which were discussed above in the introduction.

The test image may have been acquired by the image sensor (if present) or by another image sensor, in which case the test fingerprint is of tenprint type. Alternatively, the test image may be received via the communication interface, and may be latent.

The test image contains a plurality of pixels forming a two-dimensional grid. Each pixel has a specific position in this grid, and contains light-related information. Its color information is of any type: it may be one-component (grayscale), three-component (red, green, blue for example), etc.

All or some of the pixels in the test image show the test fingerprint.

Figure 3:
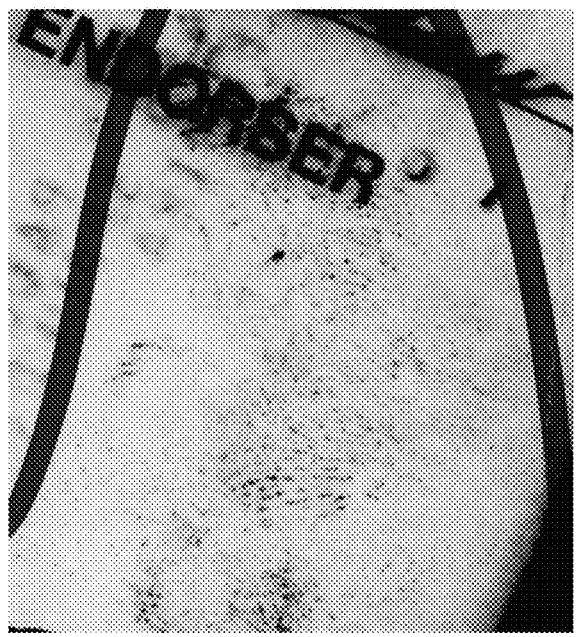
FIG. 3 contains two images: on the left, an image containing a latent fingerprint, and, on the right, a visual representation of a local inter-ridge distance map that was produced by applying the method of FIG. 2 to the image on the left.
Figure 3:
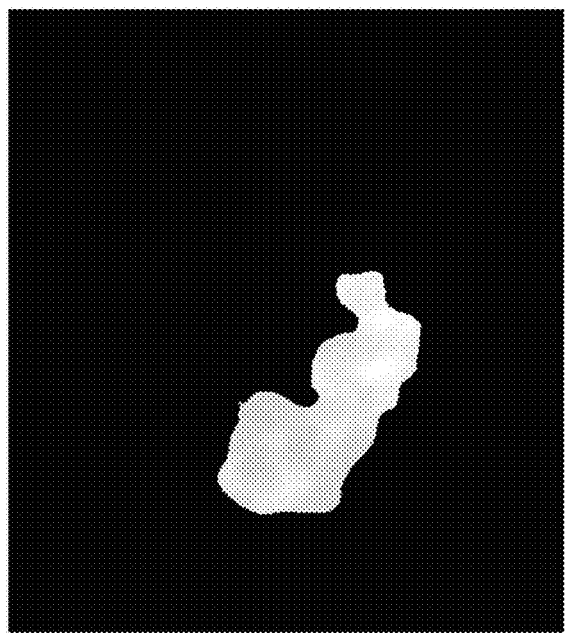
Figure 3:
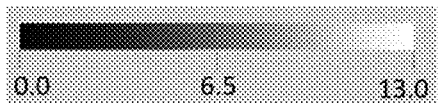

FIG. 3 shows on the left an example of a test image containing a latent fingerprint capable of being processed by the device 1. It may be seen that the latent fingerprint does not cover all of the image, and indeed that it is only partially visible.

Figure 4:
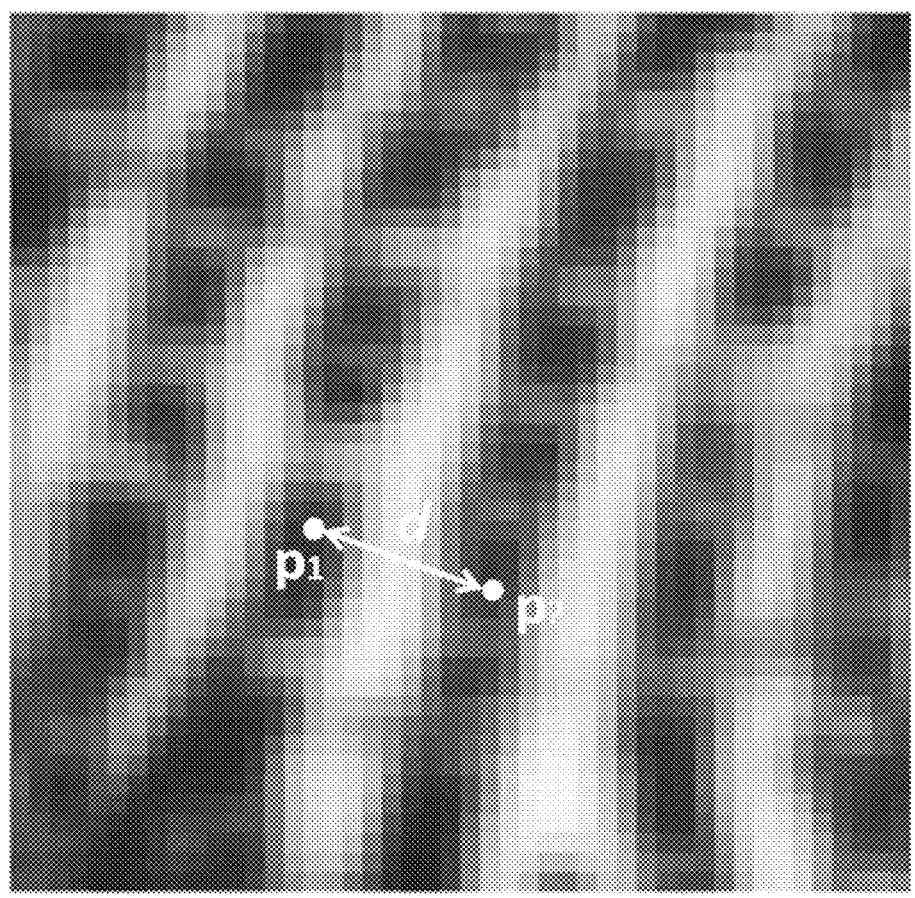
FIG. 4 is an image portion annotated so as to show an inter-ridge distance.

It will be recalled that a fingerprint is a pattern drawn by ridges formed on the finger of an individual. As already recalled in the introduction, two adjacent ridges are separated by an inter-ridge distance. The inter-ridge distances are different from one fingerprint to another. FIG. 4 shows an inter-ridge distance appearing in a magnified image portion. As may be seen in this figure, an inter-ridge distance extends over a certain number of pixels.

The resolution of the test image is not known to the processing device 1.

Returning to FIG. 2, the processor 10 implements the following steps on the basis of the test image.

In a step 104, the processor extracts features from the test image by means of an extraction neural network. The extracted features are generally called "feature maps" in the literature.

Conventionally, a neural network comprises a succession of layers. Each layer contains neurons that receive input from neurons of the preceding layer. Layers having various functions are known. In particular, as known, the function of a normalization layer is to normalize data that it receives as input, so as to limit dispersion in the data output from the neural network.

The extraction neural network may be convolutional, in which case at least one of the layers of the neural network is a convolutional layer.

The extraction neural network has the particularity of being devoid of normalization layer. It will be seen in the following that this absence of a normalization layer is advantageous, contrary to what might be thought at first glance.

In a step 106, the processor 10 generates a preliminary classification map from the test image. More precisely, the preliminary classification map is generated by the processor 10 using a classification neural network into which the features extracted by the extraction neural network are input, the classification neural network having been trained beforehand.

The classification neural network classifies the N classes of inter-ridge distances in pixels discussed above, and the classification map reflects the result of this classification.

The preliminary classification map comprises, for each block of a set of blocks covering the entire test image and for each class forming part of the plurality of N classes, a preliminary score associated with the block and with the class.

In the present text, a "block" of an image is a region of the image that is unitary and contains one or more pixels of the image. In one preferred embodiment, each block in question is in fact one pixel of the test image. In this case, the set of blocks covering the entire image is the set of the pixels of the test image, and hence the number of preliminary scores is equal to N multiplied by the number of pixels in the test image.

The preliminary score $p_i$ associated with a block and with the class of index i is indicative of a probability of existence, in the test image, of a segment passing through the block and the length of which constitutes an inter-ridge distance of the fingerprint included in the class of index i.

In one embodiment, the preliminary score $p_i$ associated with a block and the class of index i is directly the probability of existence such as defined above. The preliminary score $p_i$ then has a value comprised between 0 and 1. In this case, the higher the value of the preliminary score, the higher the probability of existence. However, it will be understood that the preliminary score $p_i$ may be indicative of such a probability of existence, without however directly taking the form of this probability. Specifically, the preliminary score may be a datum on the basis of which such a probability of existence may be deduced.

To summarize, the operation carried out by the classification neural network may be considered to be that of partitioning the test image into blocks, and of assigning, to each block, a discrete distribution of N scores $p_1, \ldots, p_N$ associated with the classes of indices ranging from 1 to N, respectively. These scores $p_i$ indicate which inter-ridge distance values are most probably contained in the corresponding block.

In the vast majority of images containing a fingerprint, the fingerprint does not cover the entire image, but is visible in only one section of the image (this is in particular the case in the image shown on the left of FIG. 3). Thus, the test fingerprint may be visible only in certain blocks of the test image, which by convention are referred to as "blocks of interest", the other blocks of the test image providing no relevant information on the test fingerprint. To summarize, the initial set of blocks, covering the entire image, comprises a plurality of blocks of interest, this plurality of blocks of interest forming a subset of the initial set of blocks.

To take this aspect into account, the processor 10 generates, in a step 108, a binary mask estimating, for each block of the set of blocks, whether the block is a block of interest (i.e. a block containing a fingerprint) or not (i.e. a block not containing a fingerprint).

The binary mask is generated by a semantic segmentation neural network into which the features extracted by the extraction neural network are input, the semantic segmentation neural network having been trained beforehand. The semantic segmentation neural network operates in parallel with the classification neural network.

For example, the binary mask assigns the value 1 to each block of interest (considered to contain a fingerprint), and the value 0 to the other blocks (considered not to contain a fingerprint).

To assign a value 0 or 1, the semantic segmentation neural network may implement the following sub-steps.

In a first sub-step, the segmentation neural network generates a segmentation map on the basis of the features previously extracted from the test image. The segmentation map comprises, for each block, a probability that the block contains a fingerprint. This probability has a value comprised between 0 and 1.

In a second sub-step, the segmentation neural network determines a threshold to be applied to the segmentation map. Preferably, the threshold is equal to the maximum probability of the segmentation map multiplied by a predefined coefficient strictly lower than 1, for example 0.65.

In a third sub-step, the segmentation neural network thresholds the segmentation map using the determined threshold, so as to produce the binary mask. During this sub-step, any probability below the threshold is set to zero, while any probability above the threshold is set to 1.

In a step 110, the processor applies the binary mask to the preliminary classification map so as to generate a masked classification map.

For example, application of the binary mask to the preliminary classification map comprises obtaining a Hadamard product of the preliminary classification map and of the binary mask (this product being represented in FIG. 2 by the sign X).

The masked classification map comprises, for each block of interest and for each class of the plurality of N classes, a score associated with the block of interest and with the class. The score associated with a block and a class is indicative of a probability of existence, in the reference image, of a segment passing through the block and the length of which constitutes an inter-ridge distance of the fingerprint included in the class.

It will be understood that the masked classification map has a content similar to that of the classification map generated by the classification neural network used upstream.

Each score of the masked classification map, which score is associated with one block of interest and with one given class, is derived from the preliminary score associated with this block of interest and with this class.

Preferably, each score of the masked classification map, which score is associated with one block of interest and with one given class, is precisely the preliminary score associated with this block of interest and with this class. In other words, a preliminary score associated with a block of interest is also a score in the masked classification map, its value remaining unchanged.

However, the masked classification map is restricted to blocks of interest.

This restriction may be realized in a number of ways.

The restriction may be realized so that the masked classification map comprises N scores $p_1, \ldots, p_N$ only for the blocks of interest, i.e. the blocks that have been designated by the binary mask as containing a fingerprint. In this case, the number of scores contained in the masked classification map is less than the number of preliminary scores contained in the preliminary classification map. In this case, only scores relating to blocks of interest of the test image (only the one or more blocks containing a fingerprint according to the binary mask) are retained, and scores relating to the other blocks of the set of blocks covering the entire image are eliminated.

As a variant, the restriction to blocks of interest is realized by forcing the value of any score relating to a block that is not a block of interest to a value indicating that the score is irrelevant, for example by forcing this value to zero. In the rest of the method, the processor is thus able to recognize an irrelevant score, and thus ignore it.

Whatever the nature of the realized restriction, application of the binary mask may be considered equivalent to filtering the preliminary classification map so as to allow the processor to subsequently limit processing operations to relevant scores. This allows the hardware resources required to subsequently implement the subsequent steps of the method to be decreased. In addition, this restriction improves the accuracy of the estimate delivered by the method, because areas that are not of interest are excluded.

In a step 112, the processor 10 generates a local inter-ridge distance map on the basis of the masked classification map.

The local inter-ridge distance map comprises, for each block of interest, a local inter-ridge distance in pixels estimated for the block of interest. Here, the qualifier "local" is used to illustrate the fact that a local inter-ridge distance is information associated with a block constituting only one portion of the test image, and not more global information.

A local inter-ridge distance in pixels estimated for a block is computed on the basis of selective data derived from the masked classification map and from the plurality of N classes.

These selective data comprise a score $p_k$ indicative of a maximum probability of existence among the N scores $p_1, \ldots, p_N$ associated with the block in question. Thus, in the case where the score indicative of a maximum probability of existence is a score $p_k$ of maximum value, the index k of the first score is:

$$k = \underset{i=1,\ldots,N}{\mathrm{argmax}}(p_i)$$

The selective data moreover comprise a value $C_k$ included in the class of index k associated with the score $p_k$. For example, the value $C_k$ is the median value of the class of index k.

Taking the data $p_k$ and $C_k$ into account allows a relevant local inter-ridge distance to be obtained. Specifically, the masked classification map indicates that, if there is in the test image a segment passing through the block in question and the length of which constitutes an inter-ridge distance, then the most probable hypothesis is that this length is included in the class of index k. This is what the score $p_k$ indicative of a maximum probability of existence reflects. Taking this class into account allows a more accurate distance estimation.

If k>1, then the selective data used to compute the local inter-ridge distance associated with a block preferably comprise:
- the score $p_{k-1}$ associated with the class of index k−1 (which is therefore a class adjacent to the class of index k in the plurality of N classes),
- a distance value $C_{k-1}$ included in the class of index k−1, such as the medial value of the class of index k−1.

If k<N, then the selective data used to compute the local inter-ridge distance associated with a block preferably comprise:
- the score $p_{k+1}$ associated with the class of index k+1 (which is therefore a class adjacent to the class of index k in the plurality of classes),
- a distance value $C_{k+1}$ included in the class of index k+1, such as the medial value of the class of index k+1.

Thus, the one or more classes adjacent to the most relevant class of index k are preferably taken into account, and other classes are not taken into account. This has the advantage of further refining the estimation of the local inter-ridge distance.

If 1<k<N, then the local inter-ridge distance associated with the block in question may be computed in the following way:

$$\frac{p_{k-1}C_{k-1} + p_k C_k + p_{k+1} C_{k+1}}{p_{k-1} + p_k + p_{k+1}}$$

The local inter-ridge distance is thus an average of the distances $C_{k-1}$, $C_k$ and $C_{k-1}$ weighted by the corresponding scores $p_{k-1}$, $p_k$ and $p_{k+1}$, respectively. With such a computation, an interpolation is carried out that allows values forming part of a continuous and non-discrete space to be obtained as output, this also contributing to refining the estimation.

On the right of FIG. 3 one example of a local inter-ridge distance map obtained on the basis of the test image on the left of FIG. 3 has been shown. The black part corresponds to the irrelevant blocks. It may be seen that the blocks of interest cover a specific area of the image. This area contains various grayscale levels to illustrate the fact that the local inter-ridge distances estimated in this area have different values, with a maximum value equal to 13.

The processor 10 selects at least one class of interest from the plurality of classes of distances, using the masked classification map. Each class of interest may be selected by the processor 10 by means of steps 114 and 116, which are as follows.

In step 114, the processor 10 computes a histogram on the basis of the masked classification map. The histogram comprises, for each of the N classes of distance in pixels, an aggregated score obtained by aggregating the scores associated with the class, these scores being associated with the various blocks of interest retained in the masked classification map. Thus, if the masked classification map contains NM scores, M being the number of blocks of interest identified by the binary mask, then the aggregated score for the class of index i results from aggregation of the M scores $p_i$ associated with the M blocks of interest, respectively. Since there are N classes, N aggregated scores are produced in this step 114.

An aggregation that is particularly inexpensive in terms of hardware resources consists simply in summing the M scores $p_i$ respectively associated with the M blocks of interest, to obtain the aggregated score of the class of index i. Other types of aggregation could however be employed instead of a summation in step 114.

In step 116, the processor 10 detects at least one score constituting a local maximum of the histogram. Each class of interest is a class associated with a score constituting a detected local maximum.

Figure 5:
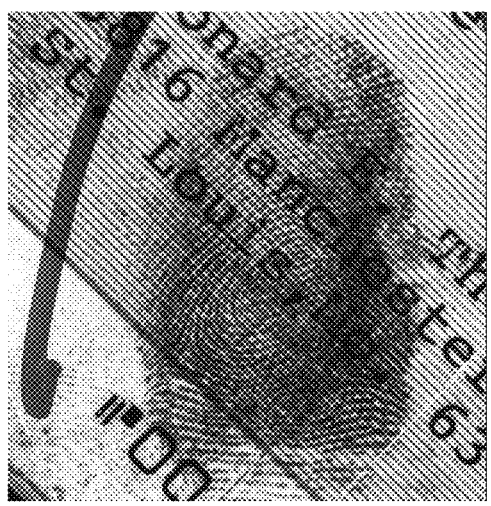
FIG. 5 contains two images: on the left, another image containing a latent fingerprint, and, on the right, a histogram derived from the image on the left.
Figure 5:
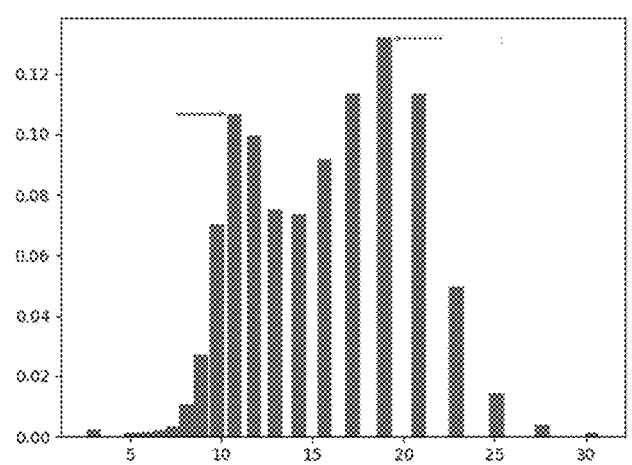

It will be noted that the histogram computed in step 114 may contain a single local maximum or a plurality of local maxima. For example, FIG. 5 on the left shows another example of a test image, this time one containing interfering signals (the oblique lines), and on the right shows the histogram obtained on the basis of this test image. This histogram contains two local maxima: a principal local maximum of high value (higher than 0.12) associated with a class of interest the values of which are slightly lower than 20 pixels, and a secondary local maximum of lower value (between 0.10 and 0.12) associated with another class the values of which are slightly higher than 10 pixels.

For the sake of clarity, it will initially be assumed that a single local maximum is detected in step 116, and therefore that the processor selects only a single class of interest from the plurality of N classes of distance in pixels.

In a step 118, the processor 10 estimates an average inter-ridge distance of the test fingerprint on the basis of the local inter-ridge distance map and the selected class of interest. The estimation 118 comprises the following sub-steps.

It will be recalled that the local inter-ridge distance map comprises M local inter-ridge distances in pixels respectively associated with the M blocks of interest previously retained in the masked classification map.

In a first sub-step of step 118, the processor 10 selects distances of interest from among the M local inter-ridge distances in pixels respectively associated with the M blocks of interest, based on a criterion of proximity to the class of interest. A local inter-ridge distance the value of which is close to the values of the class of interest is selected here. In contrast, a local inter-ridge distance the value of which is far from the values of the class of interest is not selected.

Preferably, the distances of interest are the local inter-ridge distances in pixels having values comprised in an interval the bounds of which are determined on the basis of a distance value included in the class of interest.

For example, the interval is centered on the median value of the class of interest, and has a predefined length. As a variant, the lower bound is equal to (100−x) % of the median value of the class of interest, and the upper bound of the interval is equal to (100+x) % of the median value of the class of interest, with x comprised between 0 and 100, and for example 35. Regardless of the method used to construct the interval, the interval represents a bounded neighborhood around a value derived from the class of interest.

In another sub-step, the processor computes an average of the distances of interest selected in the preceding sub-step.

The result of this averaging is the average inter-ridge distance in pixels estimated for the test fingerprint.

This estimated average inter-ridge distance in pixels is obtained without prior knowledge of the resolution of the test image being required. Specifically, none of steps 102, 104, 106, 108, 110, 112, 114, 116 and 118 had such a resolution as a parameter; the method worked exclusively with distances expressed in pixels.

It is possible for the reference images stored by the server to have a different resolution to the resolution of the test image (the latter resolution being unknown). In this case, comparing the test image with the reference images would be liable to lead to false negatives or false positives.

To overcome this problem, the device 1 obtains, in a step 120, a reference inter-ridge distance, expressed in pixels, relating to a reference fingerprint contained in a reference image stored in the database.

To obtain this average inter-ridge distance in step 120, the processing device 1 may send a request to the server 2 via its communication interface 12, the server 2 returning the reference inter-ridge distance in pixels in response to the request.

For example, the reference inter-ridge distance in pixels is computed in advance, i.e. before the request aiming to obtain it is sent, and for example when the reference image is stored on the server 2. As a variant, the server 2 may estimate this reference inter-ridge distance on receipt of the request, for example by means of steps 104 to 118 applied to a reference image stored by the server 2.

In a step 122, the processing device 1 resizes the test image to a resized image, so that the estimated average test inter-ridge distance in pixels corresponds to the reference inter-ridge distance in pixels. This resizing is typically scaling, i.e. a transformation that does not change the aspect ratio of the test image.

The resizing step 122 may thus comprise computing a scale factor, namely a ratio of the reference inter-ridge distance in pixels to the average inter-ridge distance in pixels estimated for the test image, and applying this scale factor to the test image to obtain the resized image.

For example, let it be assumed that the average inter-ridge distance estimated for the test image is 5 pixels, and that the obtained reference inter-ridge distance is 10 pixels. In this case, the test image is resized so that the inter-ridge distance of the test image passes from 5 pixels to 10 pixels in the resized image, using a scaling factor equal to 2 (10 divided by 5).

In a step 124, the processor 10 commands a comparison between the resized test image and the reference image, so as to verify a match between the test fingerprint and the reference fingerprint.

The comparison, which is made in a way known in the art, is typically carried out by the server 2. To command this comparison, the processing device 1 may send a comparison request and the resized image to the server 2. The resized image may for example be sent to the server in encrypted form, to increase confidentiality.

It was seen above that the processor 10 may in certain cases select not one but a plurality of classes of interest (in particular if a plurality of local maxima is detected in the histogram in step 116). This may occur in test images containing multiple spatial frequencies, and in which the test print gets mixed up with other periodic signals, for example as in the example discussed above of FIG. 5. In this case, step 118 is repeated for each class of interest, so as to produce a plurality of average distances in pixels respectively associated with the classes of interest.

Moreover, steps 122 and 124 are first implemented based on the average distance in pixels associated with the class of interest for which a local maximum having the highest value among the detected local maxima was found. If it is observed that the resized image and the test image do not match, then steps 122 and 124 are implemented again based on another average distance. Thus, the various local maxima are successively tested in order of decreasing probability.

It was seen above that the N classes have sizes that increase with their median. This is advantageous, since a higher accuracy is obtained for small inter-ridge distances, which are more sensitive to small absolute errors (for example, making an error of 1 is more serious for an expected distance of 3 than for an expected distance of 20).

It was also seen above that the extraction neural network is preferably devoid of normalization layer. The inventors have discovered that the presence of normalization layers in the extraction neural network leads to biases in the estimation of average distance in pixels, above all when the test fingerprint rests on a noisy background. Specifically, textures appearing in the test image around the test fingerprint may disrupt correct operation of the network in the fingerprint-containing areas and lead to an average distance that is incorrect (excessively over-estimated or under-estimated).

Figure 6A:
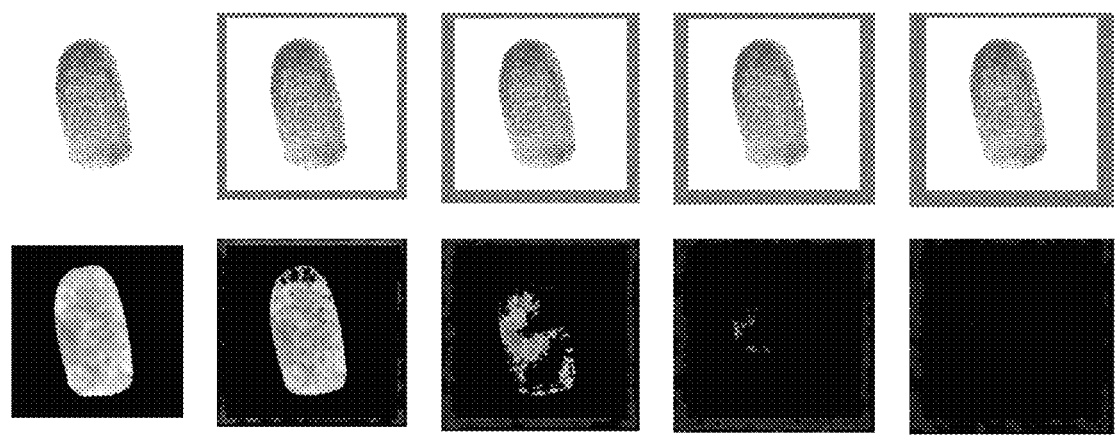
FIG. 6a shows a series of results obtained by applying to images a method using a neural network comprising normalization layers.
Figure 6B:
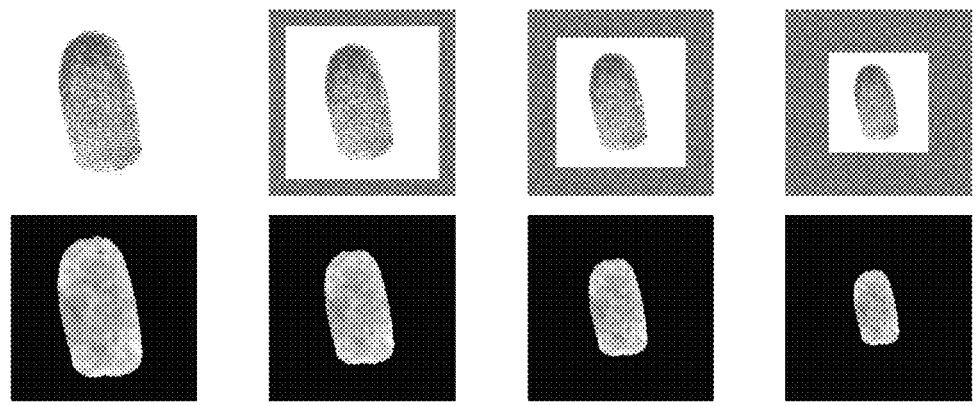
FIG. 6b shows a series of results obtained by applying to images a method using a neural network devoid of normalization layer.

To confirm this discovery, comparative trials consisting in implementing the method with a batch-normalization layer while gradually adding padding in the form of random noise to very visible fingerprints (of tenprints type) have been carried out. FIG. 6a shows a series of results obtained with the normalization layer, and FIG. 6b shows a series of results obtained without a normalization layer for the same fingerprint. The images on a white background, and with a gray border where appropriate, are the test images input, and the images on a black background are the corresponding local distance maps obtained. In FIGS. 6a and 6b, the padding corresponds to the gray border around the white square containing the test fingerprint. It may be seen that the absence of a normalization layer allows local distance maps that are much more resistant to the injected noise to be obtained.

Moreover, to measure the added value of the resizing step, the inventors carried out comparative tests consisting in implementing comparisons between the test image and the reference image (step 124) with and without prior resizing of the test image. It was then verified to what extent the comparison results were or were not erroneous (false positive or false negative). An improvement in accuracy of about 14 points was observed when resizing is implemented before comparison. In some cases, the error decreased from 17% to 2.2%, this being almost 8 times less error.

The invention claimed is:

1. A method for processing a test image containing a test fingerprint, the method comprising the following computer-implemented steps:
   generating a classification map from the test image, the classification map comprising, for each block forming part of a plurality of blocks of the test image and for each class of a plurality of classes of distances in pixels, a score associated with the block and with the class, the score associated with the block and with the class being indicative of a probability of existence in the test image of a segment passing through the block and the length of which in pixels constitutes an inter-ridge distance of the fingerprint included in the class,
   generating a local inter-ridge distance map on the basis of the classification map, the local inter-ridge distance map comprising, for each block of the plurality of blocks, a local inter-ridge distance in pixels estimated for the block,
   estimating an average inter-ridge distance in pixels of the test fingerprint on the basis of the local inter-ridge distance map and of a class of interest forming part of the plurality of classes of distance in pixels, the estimation comprising selecting, from the local inter-ridge distance map, local inter-ridge distances of interest according to a criterion of proximity to the class of interest, and computing an average of the local inter-ridge distances of interest.

2. The method as claimed in claim 1, wherein the local inter-ridge distance in pixels estimated for a block is computed on the basis of:
   a first score ($p_k$) indicative of a maximum probability of existence among the scores associated with the block, the first score being associated with a first class forming part of the plurality of classes of distances,
   a first distance value in pixels ($C_k$) that is included in the first class.

3. The method as claimed in claim 2, wherein the local inter-ridge distance in pixels estimated for a block is computed on the basis of:
   a second score ($P_{k-1}$) associated with a second class, the second class being adjacent to the first class in the plurality of classes of distances in pixels,
   a second distance value in pixels ($C_{k-1}$) that is included in the second class.

4. The method as claimed in claim 3, wherein the local inter-ridge distance in pixels estimated for a block is computed on the basis of:
   a third score ($P_{k+1}$) associated with a third class, the third class being adjacent to the first class in the plurality of classes of distances in pixels, and the third class being distinct from the second class,
   a third distance value in pixels ($C_{k+1}$) that is included in the third class.

5. The method as claimed in claim 4, wherein the local inter-ridge distance in pixels estimated for a block is computed as an average of the first distance value, of the second distance value and of the third distance value, weighted by the first score, the second score and the third score, respectively.

6. The method as claimed in claim 1, further comprising steps of:
   generating a preliminary classification map from the test image, the preliminary classification map comprising, for each block of a set of blocks covering the entire test image and for each class of the plurality of classes of distances in pixels, a preliminary score associated with the block and with the class, the preliminary score associated with the block and with the class being indicative of a probability of existence in the test image of a segment passing through the block and the length of which in pixels constitutes an inter-ridge distance of the fingerprint included in the class,
   on the basis of the test image, generating a binary mask estimating, for each block of the set of blocks, whether or not the block contains a fingerprint,
   applying the binary mask to the preliminary classification map so as to generate the classification map, the plurality of blocks being restricted to each block that the binary mask deems to contain a fingerprint.

7. The method as claimed in claim 6, wherein the preliminary classification map is generated using a first neural network, and the binary mask is generated using a second neural network operating in parallel with the first neural network.

8. The method as claimed in claim 6, wherein application of the binary mask to the preliminary classification map comprises obtaining a Hadamard product of the preliminary classification map and of the binary mask.

9. The method as claimed in claim 1, further comprising extracting features from the test image using a neural network devoid of a normalization layer, the classification map being derived from the extracted features.

10. The method as claimed in claim 1, wherein the local inter-ridge distances of interest selected according to the criterion of proximity to the class of interest are local inter-ridge distances comprised in an interval having bounds determined on the basis of a distance value included in a reference class, the interval forming a neighborhood around the distance value.

11. The method as claimed in claim 10, comprising steps of
   computing a histogram on the basis of the classification map, the histogram comprising, for each class forming part of the plurality of classes of distances in pixels, an aggregated score obtained by aggregating the scores associated with the class,
   detecting at least one local maximum of the histogram, the class of interest being associated with a local maximum detected in the histogram.

12. The method as claimed in claim 11, wherein:
   a plurality of local maxima is detected in the histogram, each local maximum being associated with one class of interest forming part of the plurality of classes of distances in pixels,
   the estimating step is implemented for each class of interest, so as to produce a plurality of average inter-ridge distances in pixels.

13. The method as claimed in claim 1, further comprising steps of:
   obtaining a reference inter-ridge distance in pixels relating to a reference fingerprint contained in a reference image, resizing the test image to a test image resized so that the average inter-ridge distance in pixels corresponds to the reference inter-ridge distance, commanding comparison between the resized test image and the reference image, so as to verify a match between the test fingerprint and the reference fingerprint.

14. The method as claimed in claim 13, wherein:

a plurality of local maxima comprises a principal local maximum and a secondary local maximum less than the principal local maximum, the plurality of average inter-ridge distances in pixels comprises:

a principal distance computed on the basis of the principal local maximum, a secondary distance computed on the basis of the secondary local maximum, the method further comprising:

a first implementation of the resizing and comparison-commanding steps on the basis of the principal distance, and after the first implementation, a second implementation of the resizing and comparison-commanding steps on the basis of the secondary distance instead of the principal distance, preferably provided that the first implementation led to a result indicating that the test fingerprint and the reference fingerprint do not match.

15. The method as claimed in claim 1, wherein each block is one pixel of the image.

16. The method as claimed in claim 1, wherein the plurality of classes of distances respects the following rule: the higher a median value of a class of the plurality of classes of distances, the larger a size of the class.

17. A non-transitory computer-readable memory storing instructions that are executable by the computer in order to execute the steps of the method as claimed in claim 1.

* * * * *